US010805072B2

(12) United States Patent
Corduan et al.

(10) Patent No.: US 10,805,072 B2
(45) Date of Patent: Oct. 13, 2020

(54) SYSTEM AND METHOD FOR AUTONOMOUS DYNAMIC PERSON MANAGEMENT

(71) Applicant: PokitDok, Inc., San Mateo, CA (US)

(72) Inventors: Jared Ralph Corduan, San Mateo, CA (US); Theodore C. Tanner, San Mateo, CA (US); Tim Dunlevy, San Mateo, CA (US); W. Bryan Smith, San Mateo, CA (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 190 days.

(21) Appl. No.: 16/006,169

(22) Filed: Jun. 12, 2018

(65) Prior Publication Data

US 2019/0007205 A1    Jan. 3, 2019

Related U.S. Application Data (60) Provisional application No. 62/518,529, filed on Jun. 12, 2017.

(51) Int. Cl.
*H04L 9/08* (2006.01)
*H04L 29/06* (2006.01)
(Continued)

(52) U.S. Cl.
CPC ......... *H04L 9/0825* (2013.01); *G06Q 20/367* (2013.01); *G06Q 20/383* (2013.01);
(Continued)

(58) Field of Classification Search
CPC ..... H04L 9/0825; H04L 9/0847; H04L 9/085; H04L 9/0861; H04L 9/0894;
(Continued)

(56) References Cited

U.S. PATENT DOCUMENTS 5,872,021 A    2/1999    Matsumoto et al.
6,546,428 B2    4/2003    Baber et al.
(Continued)

FOREIGN PATENT DOCUMENTS

GB    2478440    10/2013
WO    WO2012/122065    9/2012

OTHER PUBLICATIONS

Version 5010 and D.O, Center for Medicare & Medicaid Services (2 pages).
(Continued)

*Primary Examiner* — Techane Gergiso
(74) *Attorney, Agent, or Firm* — Meunier Carlin & Curfman LLC (57) ABSTRACT

A system and method for persona management in online environments provides an identity by proxy with trusted parties having portions of the private cryptographic key of the consumer so that the private cryptographic key of the consumer may be generated. The system and method implements the persona management in online environments in one embodiment using an immutable ledger with decentralized transaction consensus and a process to share portions of the private cryptographic key with trusted third parties.

26 Claims, 7 Drawing Sheets

(51) Int. Cl.
   *G06Q 20/36*   (2012.01)
   *H04L 9/32*    (2006.01)
   *G06Q 20/38*   (2012.01)

(52) U.S. Cl.
   CPC ....... *G06Q 20/385* (2013.01); *G06Q 20/3829* (2013.01); *H04L 9/085* (2013.01); *H04L 9/0847* (2013.01); *H04L 9/0861* (2013.01); *H04L 9/0894* (2013.01); *H04L 9/3236* (2013.01); *H04L 63/062* (2013.01); *H04L 63/102* (2013.01); *G06Q 2220/00* (2013.01); *H04L 63/10* (2013.01); *H04L 2209/38* (2013.01)

(58) Field of Classification Search
   CPC ... H04L 9/3236; H04L 63/062; H04L 63/102; H04L 63/10; H04L 2209/38; H04L 2209/56; G06Q 20/367; G06Q 20/3829; G06Q 20/383; G06Q 20/385; G06Q 2220/00
   See application file for complete search history.

(56) References Cited

U.S. PATENT DOCUMENTS

| | | |
|---|---|---|
| 7,386,565 B1 | 6/2008 | Singh et al. |
| 7,917,378 B2 | 3/2011 | Fitzgerald et al. |
| 7,917,515 B1 | 3/2011 | Lemoine |
| 7,970,802 B2 | 6/2011 | Ishizaki |
| 7,992,153 B2 | 8/2011 | Ban |
| 8,060,395 B1 | 11/2011 | Frasher et al. |
| 8,073,801 B1 | 12/2011 | Von Halle et al. |
| 8,095,975 B2 | 1/2012 | Boss et al. |
| 8,103,667 B2 | 1/2012 | Azar et al. |
| 8,103,952 B2 | 1/2012 | Hopp |
| 8,203,562 B1 | 6/2012 | Alben et al. |
| 8,229,808 B1 | 7/2012 | Heit |
| 8,286,191 B2 | 10/2012 | Amini et al. |
| 8,359,298 B2 | 1/2013 | Schacher et al. |
| 8,364,501 B2 | 1/2013 | Rana et al. |
| 8,417,755 B1 | 4/2013 | Zimmer |
| 8,495,108 B2 | 7/2013 | Nagpal et al. |
| 8,515,777 B1 | 8/2013 | Rajasenan |
| 8,527,522 B2 | 9/2013 | Baron |
| 8,817,665 B2 | 8/2014 | Thubert et al. |
| 8,984,464 B1 | 3/2015 | Mihal et al. |
| 9,165,045 B2 | 10/2015 | Mok et al. |
| 9,208,284 B1 | 12/2015 | Douglass |
| 9,774,578 B1 * | 9/2017 | Ateniese ............... H04L 9/085 |
| 10,068,228 B1 * | 9/2018 | Winklevoss ........... G06Q 20/36 |
| 2002/0022973 A1 | 2/2002 | Sun et al. |
| 2002/0038233 A1 | 3/2002 | Shubov et al. |
| 2002/0165738 A1 | 11/2002 | Dang |
| 2003/0055668 A1 | 3/2003 | Saran et al. |
| 2003/0097359 A1 | 5/2003 | Ruediger |
| 2003/0171953 A1 | 9/2003 | Narayanan et al. |
| 2003/0217159 A1 | 11/2003 | Schramm-Apple et al. |
| 2003/0233252 A1 | 12/2003 | Haskell et al. |
| 2004/0143446 A1 | 7/2004 | Lawrence |
| 2005/0010452 A1 | 1/2005 | Lusen |
| 2005/0071189 A1 | 3/2005 | Blake et al. |
| 2005/0102170 A1 | 5/2005 | Lefever et al. |
| 2005/0137912 A1 | 6/2005 | Rao et al. |
| 2005/0152520 A1 | 7/2005 | Logue |
| 2005/0182780 A1 | 8/2005 | Forman et al. |
| 2005/0222912 A1 | 10/2005 | Chambers |
| 2006/0036478 A1 | 2/2006 | Aleynikov et al. |
| 2006/0074290 A1 | 4/2006 | Chen et al. |
| 2006/0089862 A1 | 4/2006 | Anandarao et al. |
| 2006/0129428 A1 | 6/2006 | Wennberg |
| 2006/0136264 A1 | 6/2006 | Eaton et al. |
| 2007/0113172 A1 | 5/2007 | Behrens et al. |
| 2007/0118399 A1 | 5/2007 | Avinash et al. |
| 2007/0156455 A1 | 7/2007 | Tarino et al. |
| 2007/0174101 A1 | 7/2007 | Li et al. |
| 2007/0180451 A1 | 8/2007 | Ryan et al. |
| 2007/0214133 A1 | 9/2007 | Liberty et al. |
| 2007/0233603 A1 | 10/2007 | Schmidgall et al. |
| 2007/0260492 A1 | 11/2007 | Feied et al. |
| 2007/0276858 A1 | 11/2007 | Cushman et al. |
| 2007/0288262 A1 | 12/2007 | Sakaue et al. |
| 2008/0013808 A1 | 1/2008 | Russo et al. |
| 2008/0082980 A1 | 4/2008 | Nessland et al. |
| 2008/0091592 A1 | 4/2008 | Blackburn et al. |
| 2008/0126264 A1 | 5/2008 | Tellefsen et al. |
| 2008/0133436 A1 | 6/2008 | Di Profio |
| 2008/0288292 A1 | 11/2008 | Bi et al. |
| 2008/0295094 A1 | 11/2008 | Korupolu et al. |
| 2008/0319983 A1 | 12/2008 | Meadows |
| 2009/0083664 A1 | 3/2009 | Bay |
| 2009/0125796 A1 | 5/2009 | Day et al. |
| 2009/0192864 A1 | 7/2009 | Song et al. |
| 2009/0198520 A1 | 8/2009 | Piovanetti-Perez |
| 2009/0300054 A1 | 12/2009 | Fisher et al. |
| 2009/0307104 A1 | 12/2009 | Weng |
| 2009/0313045 A1 | 12/2009 | Boyce |
| 2010/0076950 A1 | 3/2010 | Kenedy et al. |
| 2010/0082620 A1 | 4/2010 | Jennings, III et al. |
| 2010/0088108 A1 | 4/2010 | Machado |
| 2010/0088119 A1 | 4/2010 | Tipirneni |
| 2010/0138243 A1 | 6/2010 | Carroll |
| 2010/0217973 A1 | 8/2010 | Kress et al. |
| 2010/0228721 A1 | 9/2010 | Mok et al. |
| 2010/0295674 A1 | 11/2010 | Hsieh et al. |
| 2010/0332273 A1 | 12/2010 | Balasubramanian et al. |
| 2011/0015947 A1 | 1/2011 | Erry et al. |
| 2011/0055252 A1 | 3/2011 | Kapochunas et al. |
| 2011/0071857 A1 | 3/2011 | Malov et al. |
| 2011/0137672 A1 | 6/2011 | Adams et al. |
| 2011/0218827 A1 | 9/2011 | Kennefick et al. |
| 2011/0270625 A1 | 11/2011 | Pederson et al. |
| 2012/0011029 A1 | 1/2012 | Thomas |
| 2012/0035984 A1 | 2/2012 | Srinivasa et al. |
| 2012/0078940 A1 | 3/2012 | Kolluri et al. |
| 2012/0130736 A1 | 5/2012 | Dunston et al. |
| 2012/0158429 A1 | 6/2012 | Murawski et al. |
| 2012/0158750 A1 | 6/2012 | Faulkner et al. |
| 2012/0173279 A1 | 7/2012 | Nessa et al. |
| 2012/0245958 A1 | 9/2012 | Lawrence et al. |
| 2012/0246727 A1 | 9/2012 | Elovici et al. |
| 2012/0290320 A1 | 11/2012 | Kurgan et al. |
| 2012/0290564 A1 | 11/2012 | Mok et al. |
| 2013/0030827 A1 | 1/2013 | Snyder et al. |
| 2013/0044749 A1 | 2/2013 | Eisner et al. |
| 2013/0085769 A1 | 4/2013 | Jost et al. |
| 2013/0138554 A1 | 5/2013 | Nikankin et al. |
| 2013/0166552 A1 | 6/2013 | Rozenwald et al. |
| 2013/0204940 A1 | 8/2013 | Kinsel et al. |
| 2013/0304903 A1 | 11/2013 | Mick et al. |
| 2014/0046931 A1 | 2/2014 | Mok et al. |
| 2014/0056243 A1 | 2/2014 | Pelletier et al. |
| 2014/0059084 A1 | 2/2014 | Adams et al. |
| 2014/0088981 A1 | 3/2014 | Momita |
| 2014/0136233 A1 | 5/2014 | Atkinson et al. |
| 2014/0222482 A1 | 8/2014 | Gautam et al. |
| 2014/0244300 A1 | 8/2014 | Bess et al. |
| 2014/0249878 A1 | 9/2014 | Kaufman et al. |
| 2014/0278491 A1 | 9/2014 | Weiss |
| 2014/0358578 A1 | 12/2014 | Ptachcinski |
| 2014/0358845 A1 | 12/2014 | Mundlapudi et al. |
| 2015/0095056 A1 | 4/2015 | Ryan et al. |
| 2015/0112696 A1 | 4/2015 | Kharraz Tavakol |
| 2015/0142464 A1 | 5/2015 | Rusin et al. |
| 2015/0199482 A1 | 7/2015 | Corbin et al. |
| 2015/0332283 A1 | 11/2015 | Witchey |
| 2016/0028552 A1 | 1/2016 | Spanos et al. |
| 2016/0055205 A1 | 2/2016 | Jonathan et al. |
| 2016/0253679 A1 | 9/2016 | Venkatraman et al. |
| 2016/0261411 A1 | 9/2016 | Yau |
| 2016/0328641 A1 | 11/2016 | Alsaud et al. |
| 2016/0342750 A1 | 11/2016 | Alsaud et al. |
| 2016/0342751 A1 | 11/2016 | Alsaud et al. |
| 2017/0091397 A1 | 3/2017 | Shah et al. |

(56) References Cited

U.S. PATENT DOCUMENTS

| | | | |
|---|---|---|---|
| 2017/0103164 | A1 | 4/2017 | Dunlevy et al. |
| 2017/0103165 | A1 | 4/2017 | Dunlevy et al. |
| 2017/0132621 | A1 | 5/2017 | Miller et al. |
| 2017/0250972 | A1* | 8/2017 | Ronda .................. H04L 9/3236 |
| 2017/0330174 | A1* | 11/2017 | Demarinis .............. G06F 21/62 |
| 2017/0351821 | A1 | 12/2017 | Tanner et al. |
| 2017/0372300 | A1 | 12/2017 | Dunlevy et al. |
| 2018/0040007 | A1* | 2/2018 | Lane ...................... G06Q 50/01 |
| 2019/0068360 | A1* | 2/2019 | Bhattacharya ........ H04L 9/3297 |

OTHER PUBLICATIONS

Ahlswede, Rudolf et al.; "Network Information Flow"; IEEE Transactions on Information Theory, vol. 46, No. 4; dated Jul. 2000 (13 pgs.).
Anonymous: "Oauth" Wikipedia—Retrieved from the Internet URL:https://en.wikipedia.org/wiki/Oauth (8 pgs.).
Bhattacharya, Indrajit and Getoor, Lise, Entity Resolution in Graphs, Department of Computer Science, University of Maryland (2005) (21 pgs.).
Chen et al., Adaptive Graphical Approach to Entity Resolution, Jun. 18-23, 2007, Proceedings of the 7th ACM/IEEE-CS joint conference on Digital Libraries, pp. 204-213 (10 pgs.).
Christen, Data Matching, Concepts and Techniques for Record Linkage, Entity Resolution, and Duplicate Detection, © Springer-Verlag Berlin Heidelberg 2012 (279 pgs.).
Cohen, William W., Ravikumar, Pradeep and Fienberg, Stephen E., A Comparison of String Metrics for Matching Names and Records, © 2003, American Association for Artificial Intelligence (www.aaai.org) (6 pgs.).
Coleman, James S. et al.; "Medical Innovation—a diffusion study"; The Bobbs-Merill Company, Inc.; dated 1966 (248 pgs.).
Domingos, Pedro and Hulten, Geoff, *Mining High-Speed Data Streams* (2000) (10 pgs.).
Greenhalgh, Trisha et al.; "Diffusion of Innovations in Health Service Organisations—a systematic literature review"; Blackwell Publishing; dated 2005 (325 pgs.).
Jackson, Matthew O. et al.; "The Evolution of Social and Economic Networks"; Journal of Economic Theory 106, pp. 265-295; dated 2002 (31 pgs.).
Jackson, Matthew O.; "Social and Economic Networks"; Princeton University Press; dated 2008 (509 pgs.).
Krempl et al., Open Challenges for Data Stream Mining Research, SIGKDD Explorations, vol. 16, Issue 1, Jun. 2014 (64 pgs.).
Lin et al., A simplicial complex, a hypergraph, structure in the latent semantic space of document clustering, © 2005 Elsevier Inc. (26 pgs.).
Mathjax, Naive Bayes Categorisation (with some help form Elasticsearch). Dec. 29, 2013. Blog post. Retrieved from the Internet. Retrieved from: https://blog.wtf.sg/2013/12/29/naive-bayes-categorisation-with-some-help-from-elasticsearch/. pp. 1-5; pp. 2, 5; (8 pgs.).
Newman, *Modularity and community structure in networks*, PNAS, vol. 103, No. 23, pp. 8581-8582 Jun. 6, 2006 (2 pgs.).
Rebuge, Business Process Analysis in Healthcare Environments, 2011, Ellsevier Ltd., 99-116 (18 pgs.).
Titan Database Documentation © 2015 (disclosed at http://s3.thinkaurelius.com/docs/titan/1.0.0/ (printed Sep. 16, 2016) (214 pgs.).
Wasserman, Stanley et al.; "Social Network Analysis: Methods and Applications"; Cambridge University Press; dated 1994 (434 pgs.).
Webpage: New Health Care Electronic Transactions Standards Versions 5010, D.0, and 3.0, Jan. 2010 ICN 903192; http://www.cms.gov/Regulations-and-Guidance/HIPAA-Adminstrative-Simplification/Versions5010andD0/downloads/w5010BasicsFctCht.pdf; (4 pgs.).
Webpage: U.S. Dept. of Health and Human Services, Guidance Regarding Methods for De-identification of Protected Health Information in Accordance with the Health Insurance Portability and Accountability Act (HIPAA) Privacy Rule, http://www.hhs.gov/ocr/privacy/hipaa/understanding/coveredentities/De-identification/guidance.html printed Oct. 15, 2015 (14 pgs.).
White, Scott et al.; "Algorithms for Estimating Relative Importance in Networks"; Proceedings of the ninth ACM SIGKDD international conference on Knowledge discovery and data mining; dated 2003 (10 pgs.).

* cited by examiner

```
{
    "threshold": 3,
    "shares": [
        {"pubkey": TP1_pubkey, "share": encrypted_share_1},
        {"pubkey": TP2_pubkey, "share": encrypted_share_2},
        {"pubkey": TP3_pubkey, "share": encrypted_share_3},
        {"pubkey": TP4_pubkey, "share": encrypted_share_4},
        {"pubkey": TP5_pubkey, "share": encrypted_share_5}
    ]
}
```

SYSTEM AND METHOD FOR AUTONOMOUS DYNAMIC PERSON MANAGEMENT

PRIORITY CLAIMS/RELATED APPLICATIONS

This application claims the benefit under 35 USC 119(e) and priority under 35 USC 120 to U.S. Provisional Patent Application Ser. No. 62/518,529, filed Jun. 12, 2017 and titled "System and method for autonomous dynamic person management in online marketplaces", the entirety of which is incorporated herein by reference.

FIELD

The disclosure relates generally to persona management in online marketplaces.

BACKGROUND

Consumers today are increasingly using online transactions, marketplaces and exchanges for various daily activities including shopping and purchasing goods and services. The participation in these various online transactions, marketplaces and exchanges require the consumer to disclose personal information about the consumer/participant including identity information. Typically, the identity information is used to authenticate the consumer/participant and allow the consumer/participant to perform a transaction.

Participants in these online exchanges, transactions and marketplaces, such as digital advertising, electronic commerce, and cryptoeconomic networks, are increasingly at risk of having their identity stolen or compromised in the course of everyday activity. This risk of identity theft is a significant problem with current online exchanges, transactions and marketplaces.

Figure 1:
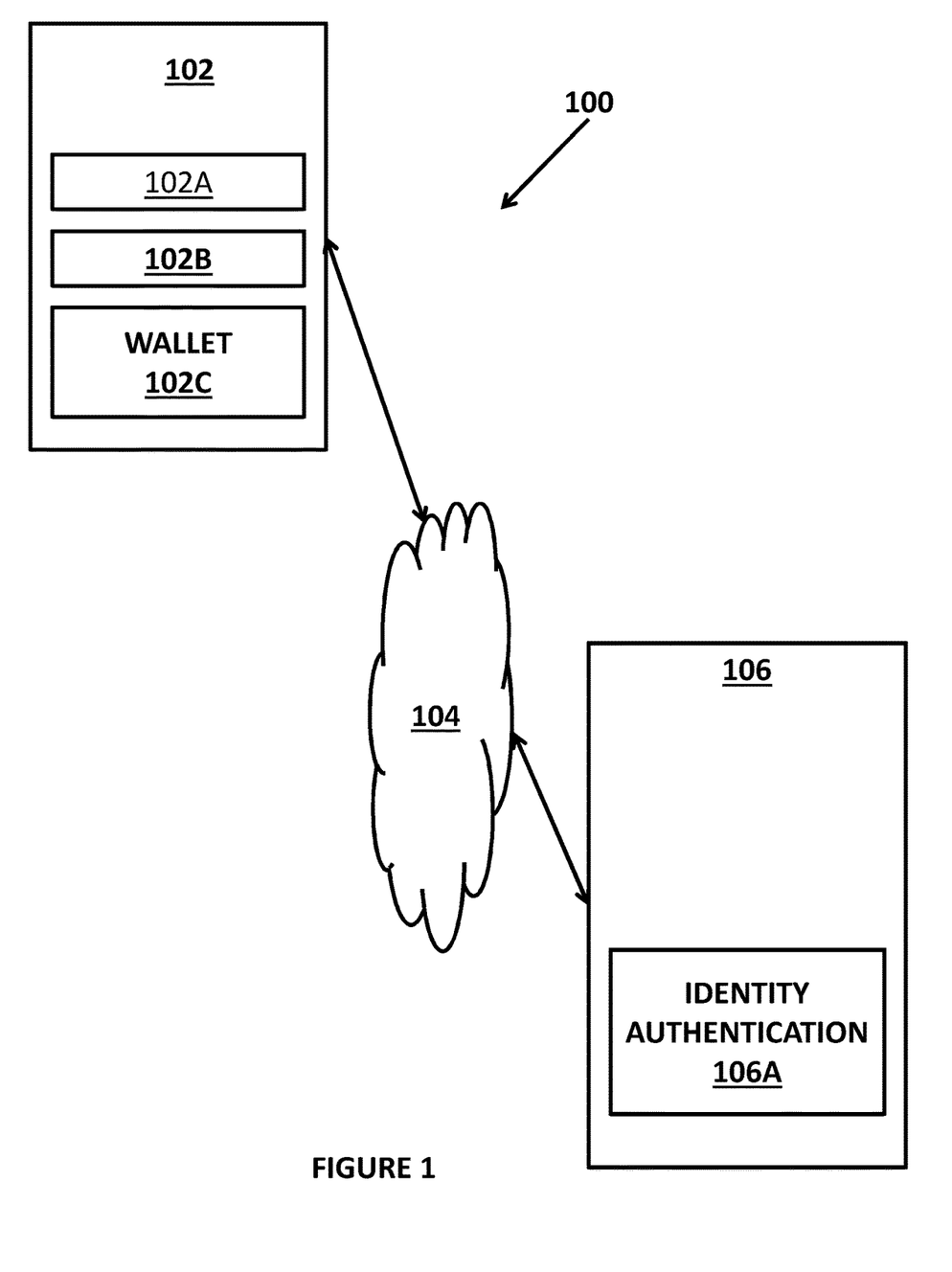
FIG. 1 illustrates an example of an online resource that uses cryptography for securing the identity of a user.

Some known systems rely exclusively on cryptographic keys/cryptography and cryptography techniques for the security of the identity of the consumer. FIG. 1 illustrates an example of an online resource 100 that uses cryptography for securing the identity of a user. A user may use a computing device 102 to access an online resource 106, such as an online marketplace, an online service, etc., over a communications path 104, such as the Internet. The computing device 102 may include a processor 102A and a memory 102B and also includes a wallet 102C that stores the identity of the user and that identity is secured using cryptography. In the typical system, the online resource 106 includes an identity authentication element 106A that verifies the identity of the user. In the typical system, the private key of the user that is used by the cryptographic system is also stored on the computing device 102.

In the typical system, the wallet system and applications 102C allow the user to store sensitive personal information, including identity information, using cryptography to secure the sensitive personal information. In these systems, the cryptography technique generates a private cryptography key for the consumer that can be used to access the sensitive personal information. Thus, the consumer must maintain the private cryptography key. The loss of access to the private cryptography key can have significant ramifications for the consumer. For example, if the consumer stores the private cryptography key on a device and that device is lost or destroyed, the consumer loses his/her access to the private cryptography key so that any data or messages encrypted using the corresponding public key of the consumer can no longer be accessed. Thus, the increasing prevalence of relying exclusively on cryptographic keys for user identification and data access in online exchanges creates a risk of personal information loss, including the identity information of the consumer, if the device(s) on which a user's private keys are stored is lost or destroyed. Thus, the current use of cryptography technology creates the above technical problem as a result of the reliance on the private cryptography key and the ease with which the device that stores that private cryptography key may be lost. It is desirable to provide a system and method that maintains the security of the sensitive personal information including the identity information while solving the private cryptography key loss problem with current systems and it is to this end that the disclosure is directed.

DETAILED DESCRIPTION OF ONE OR MORE EMBODIMENTS

The disclosure is particularly applicable to a persona management system using blockchain technology for the immutable ledger and the Shamir secret sharing scheme to share portions of the private key and it is in this context that the disclosure will be described. It will be appreciated, however, that the system and method has greater utility since the persona management system may use other immutable ledgers that have particular characteristics, the persona management system may use other methods for sharing portions of the private key and the persona management system may be implemented different from the disclosed embodiment of the persona management system that would be within the scope of this disclosure. Furthermore, the system and method may use different cryptographic algorithms that are within the scope of the disclosure. In the embodiment described below, a public key encryption algorithm is used in which each entity has a public key and a private key that are mathematically related to each other. In public key encryption, a first user uses a second user's public key to encrypt data or a message and the second user uses their private key to decrypt the data or message that was encrypted with their public key. Similarly, the first user uses their private key to decrypt an incoming piece of encrypted data or message encrypted with their public key. In public key encryption, the public key for each user is publicly available, such as in keyrings or key repositories while the private key is kept by each user without any backup so that losing the private key can have catastrophic consequences.

A system and method for persona management in online environments provides an identity by proxy with trusted parties having portions of the private cryptography key of the consumer so that the private cryptography key of the user/consumer may be re-generated. The system and method implements the persona management in online environments in one embodiment using an immutable ledger with decentralized transaction consensus and a process to share portions of the private cryptography key with trusted third parties.

Figure 2:
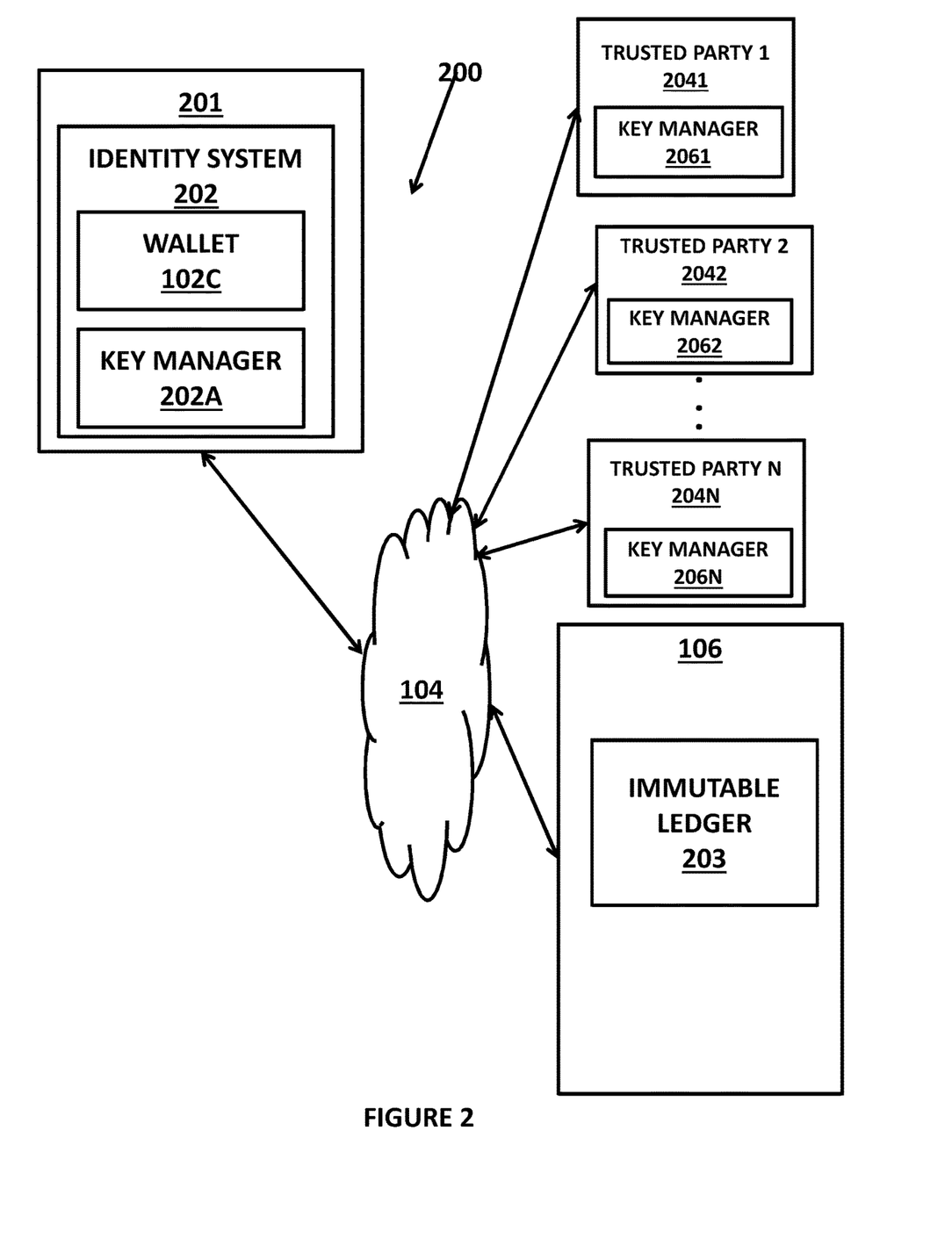
FIG. 2 illustrates a system for persona management with a plurality of trusted parties.

FIG. 2 illustrates a system for persona management 200 with a plurality of trusted parties 204. In one embodiment, each trusted party will have their public key voted in to healthcare DokChain through an on-chain governance model. The system 200 may be used with various different cryptography systems and algorithms. For illustration purposes, a public key encryption is used in the examples below, but the system and method are not limited to any particular cryptography systems and algorithm. The system for persona management includes one or more computing devices 201 of each user that each user may use to perform persona management using the system 200 as described below. Each computing device 201 may be a processor based device and may have one or more processors, a memory, storage and circuits for providing connectivity to a communication path 104. For example, each computing device 201 may be a smartphone device such as an Apple iPhone or Android based OS device, a personal computer, a tablet computer, a laptop computer and the like. The computing device 201 may host an identity system 202 that may be implemented in hardware or software and may solve the technology problems described above and provide part of a technical solution to those technology problems. When the identity system 202 (and its elements) are implemented in hardware, the system 202 may be implemented using a special purpose microcontroller or hardware device or ASIC or programmable logic device that has been specially designed to provide security to the system 202. When the system 202 is implemented in software (an example of which is shown in FIG. 2), the system and its elements may be a plurality of lines of computer code that may be executed by the processor of the computing device so that the processor is configured to perform the processes of the identity system 202 as described below.

The identity system 202 may further include the wallet 102C whose purpose and operation was described above since the wallet 102C is well-known and a key manager 202A that performs various key management functions/processes including the generation of cryptography keys, the sharing/distribution of private key portions to a plurality of trusted parties, the storage of information of the sharing of the portions of the private key to an immutable ledger 203 and a process to recover a lost private key of the user.

The system 200 may further comprise a plurality of trusted parties 204 (such as a trusted party 1 2041, trusted party 2 2042, . . . , trusted party N 204N in the example in FIG. 2) among which portions/shares of a private key may be shared. In the system, each trusted party has their own separate portion/share of the private key of the user that is encrypted with the public key of the trusted party so that the portion/share of the private key retained by each trusted party may only be decrypted by that trusted party. Each trusted party 204 may be a system or computer that may have a key manager 206 (such as 2061, 2062, . . . , 206N) wherein the key manager may be implemented in hardware or software as described above. Each trusted party may be, for example, a second computer of the user, a healthcare provider, the persona management system owner, etc. The system 200 may further comprise one or more systems, such as computer systems, that have an immutable ledger 203. The immutable ledger may be an immutable registry for keys and the trusted parties and provide decentralized transaction consensus. In one example, the immutable ledger 203 may be one or more blockchains, but may also be other mechanisms.

In operation, the system 200 may perform various processes to manage the persona/identity of each user. For example, the key manager 202A may generate an initial private key of each user ("User #1") for use in cryptography and the private key is initially generated in a known manner. Alternatively, the key manager 202A may retrieve and already generated private key (process 302 in FIG. 3 that show the private key sharing process 300). The key manager 202A may also perform a division/separation of the private key into a plurality of portions (process 304 in FIG. 3 and shown in FIG. 5 and described below in more detail) wherein each portion of the private key may be known as a share. Each of the plurality of portions of the private key cannot be used individually to generate the original private key. However, a subset of all of the portions of the private key (discussed below) or all of the portions of the private key can be used to generate the private key.

The key manager 202A may then encrypt each portion of the private key with a public key of the trusted party to which each portion is being distributed and distribute the portions/shares of the private key to the trusted parties. Thus, each trusted party is only able to decrypt the particular portion of the private key of the user that was specifically sent to that trusted party. The key manager 202A may then distribute the plurality of encrypted portions of the private key to each trusted party over the communications path 104 (process 306 in FIG. 3). The communication of the portions of the private key to the trusted parties is secure since each portion for each trusted party is encrypted with the public key of that trusted party. The identity of each trusted party and the encrypted portion of the private key for each trusted party may be stored in the immutable ledger 203. The sharing of the portions of the private key of the user provides several advantages and a technical solution to the technical problems described above. First, the shared portions of the private key provide multiple third party signatures wherein the private key of the user can be generated using the multiple third party signatures as described below. Second, due to the shared portions of the private key, the user does not in fact need to store the private key since the private key of the user can be generated from the multiple third party signatures. Third, the shared portions of the private key allow the user to recover their private key if it is lost while recovery or re-generation of the private key is not possible with the typical system. Fourth, the shared portions of the private key provide a user identity by proxy with the trusted parties being able to generate the private key of the user. Fifth, in an online exchange, transaction or marketplace, it is possible to recover/generate the private key of the user for each transaction that is also not possible using known systems. Furthermore, the persona management system has unconventional processes and an ordered combination of processes by using encryption with a sharing process to provide the portions/shares of the private key of a user to a plurality of trusted parties.

Figure 3:
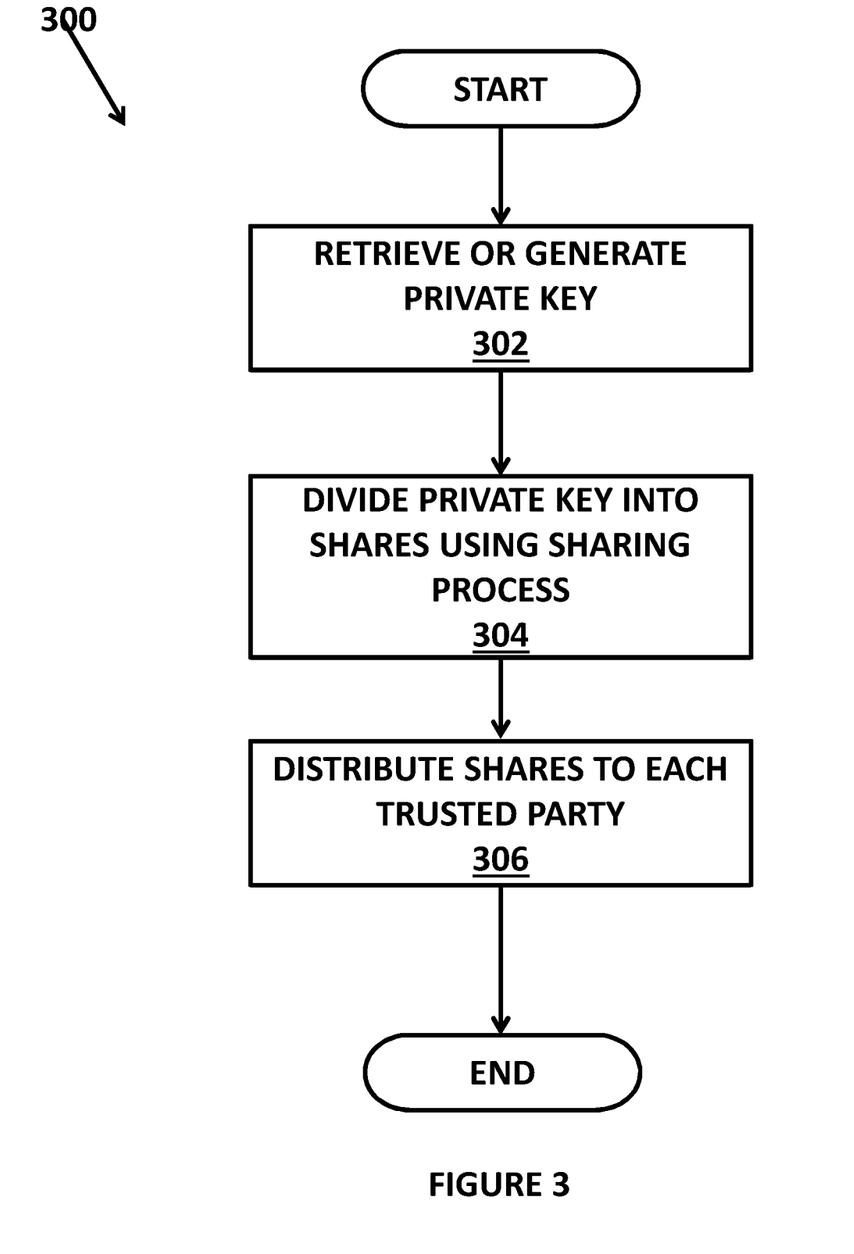
FIG. 3 illustrates a method for persona management.

If a user loses their computing device 201, the identity system 202 may be downloaded to/transferred to/installed on a new computing device of the user with the engines shown in FIG. 3. A key recovery engine 304 may then be used to recover the private key of the user so that the recovered private key may be stored on the new computing device. In contrast, with current systems, the loss of the private key requires a new public key/private key pair to be generated and all of the data/messages encrypted using the old private key cannot be decrypted.

Figure 4:
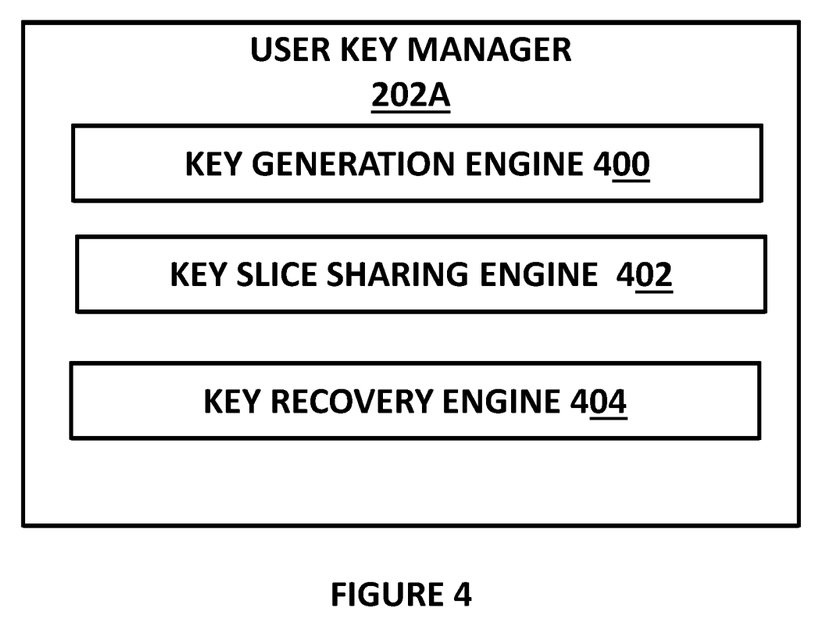
FIG. 4 illustrates the key manager element of the user's computer of the persona management system.

FIG. 4 illustrates the key manager element 202A of each user's computer of the persona management system. The key manager element 202A may have a key generation engine 400, a key slice sharing engine 402 and a key recovery engine 404. Each of these engines may be a hardware device that is specially manufactured to be secure or a plurality of lines of computer code/instructions. The key generation engine 400 may initially generate and/or store a private key of the user in a known manner for the particular cryptography algorithm being used by the system that may be stored in the key generation engine 400. The key slice sharing engine 402 may perform the processes of spitting up/slicing the private key into the plurality of portions, encrypting those portions and distributing the encrypted portions to the trusted parties. The key recovery engine 404 may be used to recover the private key if the private key is lost or it may regenerate the private key for each transaction as described above. For the re-generation of the private key of the user for each transaction, the online resource 106 may have a key manager element (not shown) that is able to, when authorized, generate the private key of the user (using the third parties).

Figure 5:
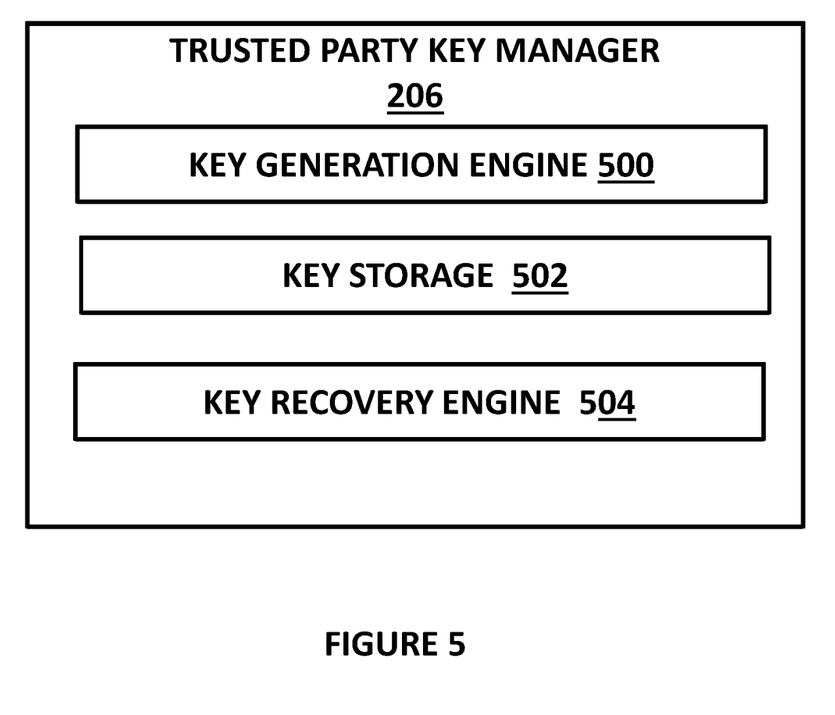
FIG. 5 illustrates the key manager element of each trusted party's computer of the persona management system.

FIG. 5 illustrates the key manager element 206 of each trusted party's computer of the persona management system. The key manager element 206 may have a key generation engine 500, a key storage 502 and a key recovery engine 504. Each of these engines may be a hardware device that is specially manufactured to be secure or a plurality of lines of computer code/instructions. The key generation engine 500 may operate similarly to the key generation engine 400 described above and may be used to generate/store a private key and public key for each trusted party. The key storage 502 may store the private key of the trusted party and as shares/portions of each user's private key entrusted to that trusted party. The key recovery engine 504 may operate similarly to the key recovery 404 described above and may be involved in the process to recover the private key of the trusted party or the process of returning the private key portion of the user back to the user as described below.

Figure 6:
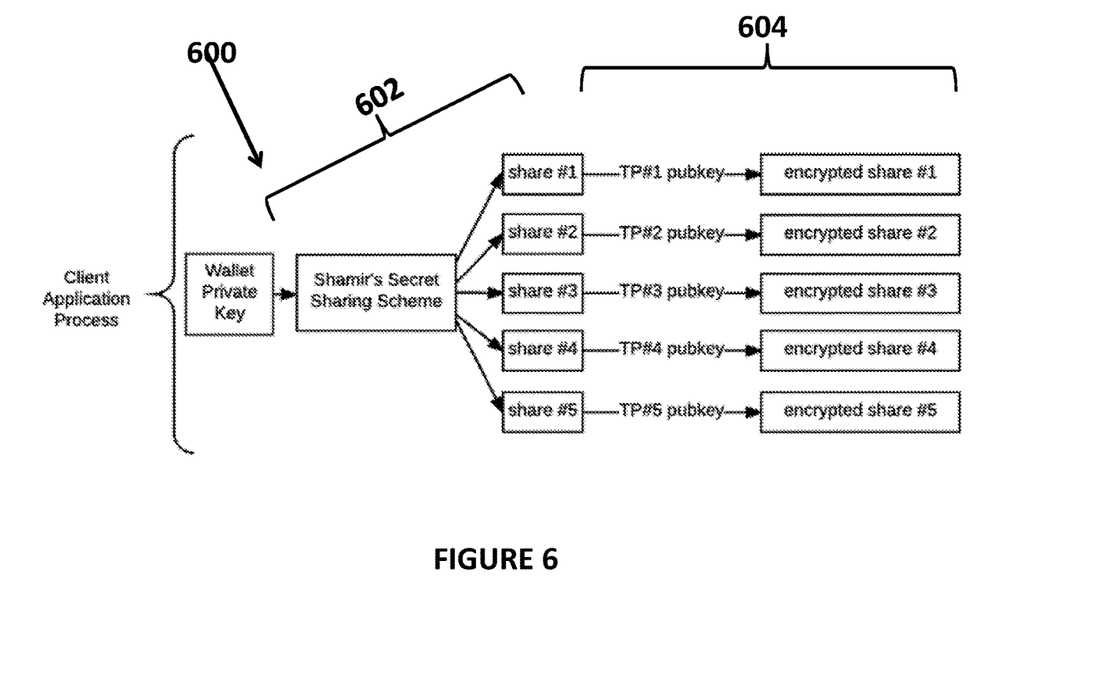
FIG. 6 illustrates a method for private key sharing.

FIG. 6 illustrates a method 600 for private key sharing. The private key sharing may be performed by the key slice sharing engine 402, but may also be performed by other entities. Furthermore, the method 600 may be performed by each user that is a party/user of the persona management system. In the example shown in FIG. 6, a private key in an electronic wallet of the user may be shared. In the method 600, an already existing private key (or a newly generated private key) is fed into a sharing process 602 that splits the private key into a plurality of portions (such as share #1, share #2, share #3, share #4 and share #5 in the example in FIG. 6). The sharing/splitting process may be done with various sharing processes that are able to split up the private key into plurality of portions, recover the private key from a subset of all of the plurality of portions and be information-theoretically secure. For example, the sharing process may be Shamir's secret sharing scheme, the Chinese remainder theorem or exclusive ORs that are standard cryptography techniques for secret sharing.

For purposes of illustration, the sharing process using Shamir's secret sharing scheme (SSSS) is described here in more detail. Secret sharing, in general, is a method of distributing shares of a secret to a group of participants in such a way that no information about the secret can be determined until some number of shares are observed together. For example, a secret could be split into five shares so that the secret is only revealed when 3 or more shares are combined. The minimum number of shares to reveal the secret is called a threshold. The recovery method outlined here will use secret sharing to distribute shares of a wallet's private key. The SSSS process may be implemented, for example using an Ubuntu package, libgfshare, which implements SSSS. libgfshare makes a clever choice for one of the parameters (prime field of order $2^8$) so that the operations are very fast and can support splitting into 255 shares with a threshold of up to 5. The size of each portion/share may be the same size as the secret being shared or double the size if hex encoding is being used.

Choosing Trusted Third Parties

In order to enable wallet recovery (described below), the owner of a wallet (the user) chooses some number trusted third parties to give a share (in the sense of SSSS) of their wallet's private key. Each such party must have a wallet. Examples of trusted parties may include the trusted parties set forth above and any known affiance members, such as the owner/operator of the persona management system, or other devices owned by the same entity, such as a secondary phone or tablet.

The wallet owner/user may also determine the secret sharing threshold (three is probably a good choice if there are a total for five shares) which is the number of the shares (a subset of the plurality of portions of the private key) from which the private key may be recovered/generated.

The sharing process 602 may set "n" as the number of trusted third parties and may split the wallet's private key into n shares, one for each trusted party with five shares being shown in the example in FIG. 6. The process may then encrypt each share (process 604 in FIG. 6) with the corresponding trusted party's public key. The wallet owner can now send a transaction to enable wallet recovery. The transaction may include generating an encrypted share for each trusted party using the public key of each trusted party that is only accessible by that trusted party. If successful, the results (the decrypted private key shares) will be saved in the trusted parties' wallets and the immutable ledger. Note that while these encrypted shares are stored on-chain (in the immutable ledger), it would require the threshold number of shares of the private key from the trusted parties to be discovered in order to discover the owner's private key.

An example of the enable recovery request parameters may be:

| Field | Value |
| --- | --- |
| Threshold | Integer between 2 and 5 |
| Shares | List of share objects |

Share Object:

| Field | Value |
| --- | --- |
| Pubkey | String containing the public key of a trusted entity |

| Field | Value |
|---|---|
| Share | A share of the requesting wallet's private key, encrypted with the trusted party's key (same as above) |

Figure 7:
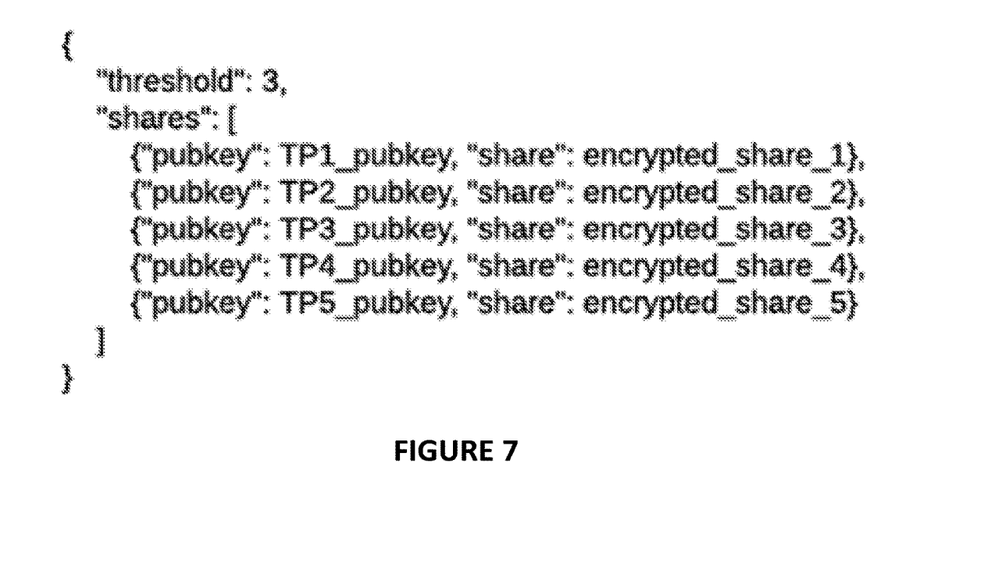
FIG. 7 illustrates an example of a request to the immutable ledger of the persona management system in the private key sharing process.

An example of this enable recovery process transaction is shown in FIG. 7 in which there are five trusted parties and the threshold is three.

Generate Private Key for Transaction

Figure 8:
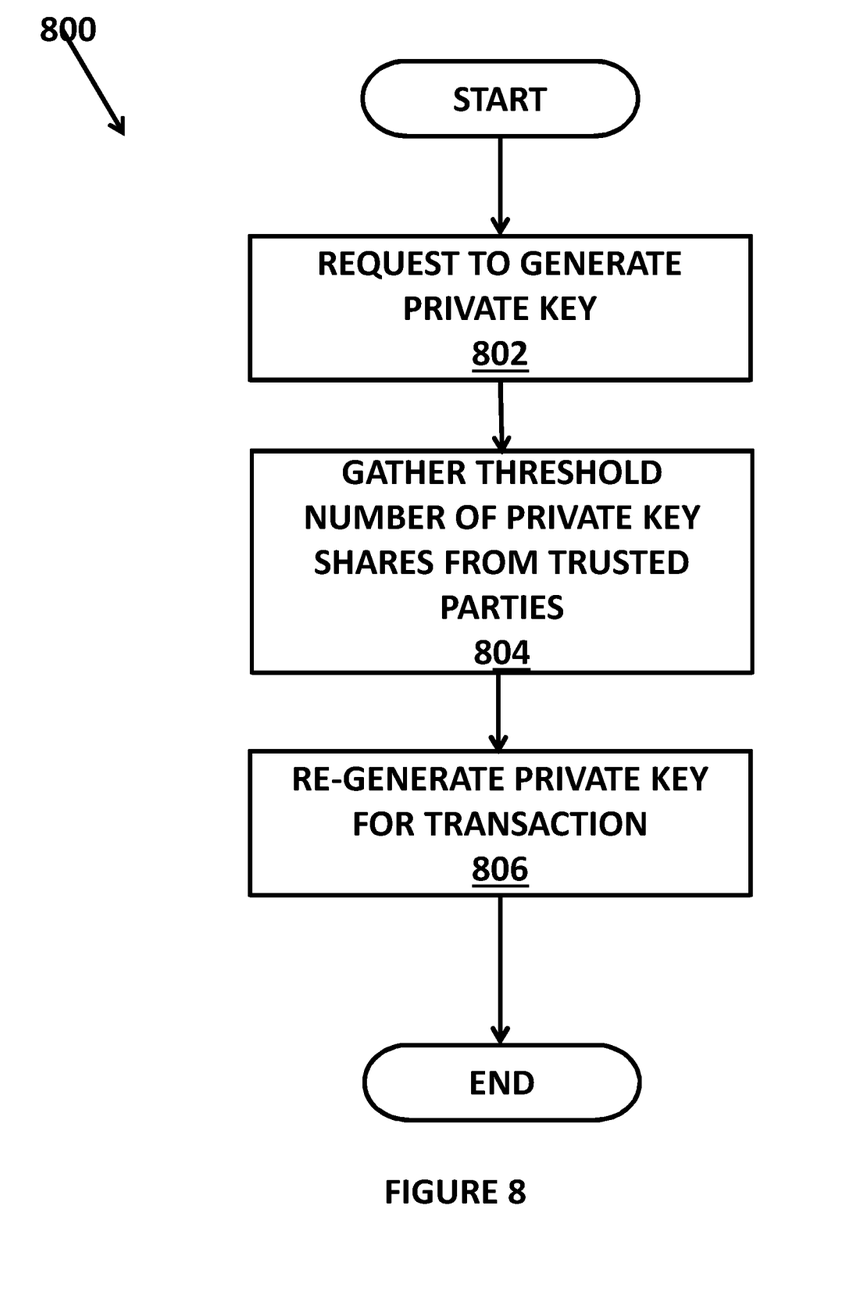
FIG. 8 illustrates a method for on the fly private key generation.

In addition to the wallet recovery/private key recovery as already discussed, the sharing of portions of the private key and the immutable ledger of the persona management system 200 also permit the private key of each user that uses the persona management system 200 to generate their private key at any time using the process described below as shown in FIG. 8. Thus, the user of the persona management system 200 does not actually need to keep/store their private key for cryptography since the private key can always be generated using a subset of the encrypted portions of the private key from the trusted parties. Thus, for any transaction in which the identity of the user must be authenticated, the private key of the user may be generated using the persona management system 200.

The method 800 shown in FIG. 8 may be performed by a trusted party key manager, the key manager 202A of the user or a key manager resident at the online resource 106 that wants to perform the transaction using the private key re-generated from the threshold number of shares of the private key. In the method 800 for on the fly (at the time of transaction) private key generation, a request is made (802) to generate the private key for the transaction. This request may be similar to the request to recover the private key described below with reference to FIG. 10. If the request is authenticated, the threshold number of private key shares from the trusted parties may be gathered (804). Thus, the entity who is generating the private key for the transaction would have each of the private key shares encrypted with his/her public key and have the same access grants. Once the shares are gathered, the private key is generated from the shares for the transaction (806) is a well known manner. For example, Shamir, Adi (1979), "How to Share a Secret", Communications of the ACM, 22(11), pp. 612-613 discloses an example of the regeneration process that is incorporated herein by reference.

Performing Wallet Recovery

The owner of a lost wallet can retrieve the shares of their private key from the trusted parties after their identity is verified using a new wallet using multi-party consensus on the immutable ledger. When a new wallet is created, it will include the key manager 202A and then use the key recovery engine to initiate the recovery of the private key. A wallet can collect access grants (which may contain a confidence score) from third parties and other smart contracts. The wallet of a trusted third party will contain a list of required access grants needed to return a share back to its original owner. If the owner's new wallet contains the necessary access grants for a given trusted party, they can issue a request on the immutable ledger to be given the corresponding share back, encrypted with the new wallet's public key.

Some trusted third parties may not require any access grants, such as a wallet corresponding to a secondary device owned by the same person. In this case, the trusted party will approve the request based on trust of the public key. Additionally, a trusted party may choose itself as the entity which must issue a grant, thus combining the roles of the trusted party and a third party verification service provider.

Figure 9:
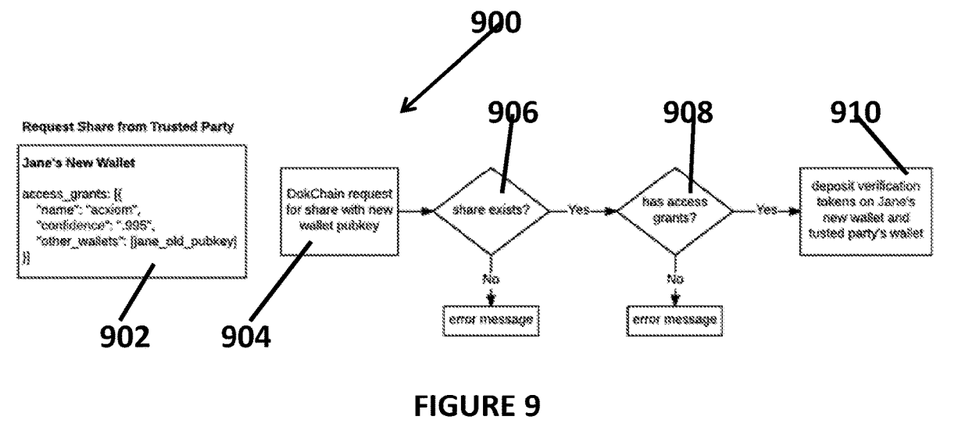
FIG. 9 illustrates a method for recovering the shares of the private key of the user.

Because the trusted party needs to decrypt the share with its private key, and then re-encrypt it with the requesting wallet's public key to return the share to the user, the process of requesting a share and returning it, if appropriate, cannot happen in one transaction so that the process involves two steps. First, the owner of the new wallet will issue a request to the immutable ledger to each of the trusted party that holds the shares (process 902 in FIG. 9 that illustrates a method for recovering the shares of the private key of the user). The share request to each trusted party may include one or more access grants as shown in FIG. 9. The wallet gets the access grants by going through an identity verification process, which uses the cryptographically verified data driven smart contract patterns.

In the method 900, the request to the trusted party may be encrypted using the new public key of the new wallet (902). The method may then determine if the share exists with the trusted party (906) and the method ends with an error message if there is no share. The method then checks to see if the new wallet request has the proper access grants (908) and the method ends with an error message if there are insufficient access grants. If the wallet request contains the correct access grants and the trusted party's wallet has a share for the old wallet, a verification token may be placed on both the new wallet and the trusted party's wallet (910). When the trusted party sees a new verification token in its wallet, the trusted party's client application can decrypt the share, encrypt the share with the new wallet pubkey, and send an immutable ledger transaction to return the (re-) encrypted share as shown in FIG. 10 that illustrates a method 1000, at each trusted party, for returning the private key share to the user.

Figure 10:
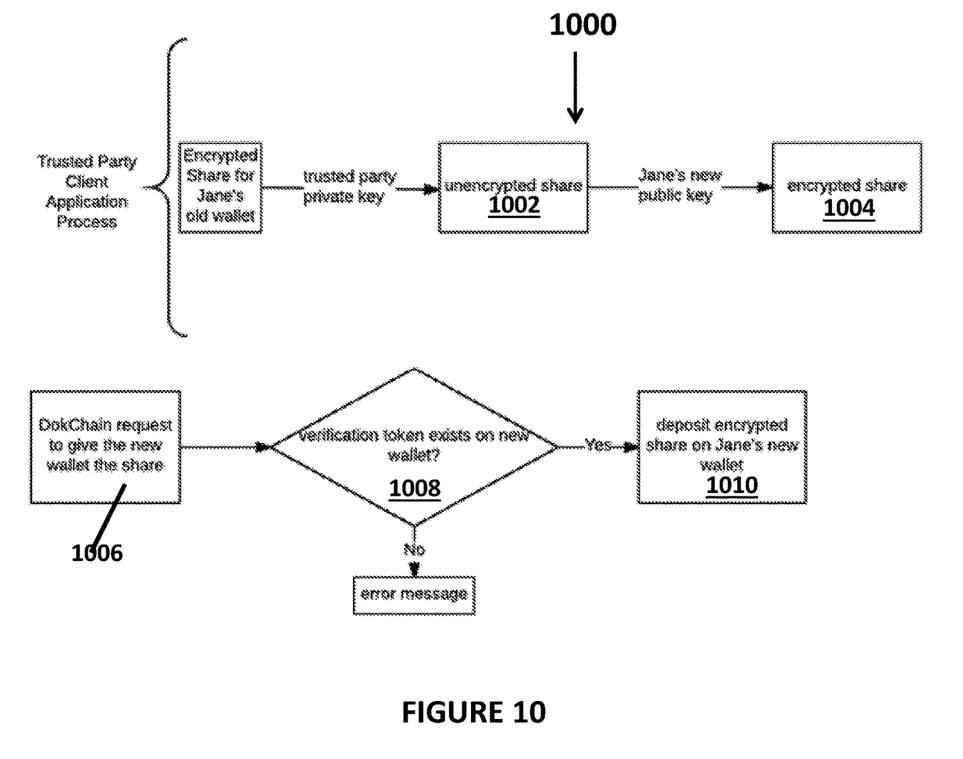
FIG. 10 illustrates a method, at each trusted party, for returning the private key share to the user.

As shown in FIG. 10, the key manager of each trusted party that has a share of the private key may decrypt the encrypted share using the trusted party's private key to generate an unencrypted share 1002 and then encrypt the unencrypted share with the user's new public key to generate a new encrypted share 1004 that can only be decrypted by the new wallet of the user so that the communication of the shares back to the user is secure. The trusted party may then generate an immutable ledger request to give the new wallet the encrypted share (1006) and the new wallet is checked for the verification tokens (1008). If the verification tokens exist on the new wallet, then the encrypted share may be deposited on the new wallet (1010) so that the private key may be recovered by the new wallet when the new wallet receives a sufficient number of portions/shares back from the trusted parties.

An example of the request share request parameters (that may be used in the process 1000) may be:

| Field | Value |
|---|---|
| previous_pubkey | string containing the pubkey of the previous wallet |
| trusted_party_pubkey | string containing the pubkey of the trusted party |

The verification token may be a dictionary with the following fields:

| Field | Value |
| --- | --- |
| old_key | string containing the pubkey of the previous wallet |
| new_key | string containing the pubkey of the current wallet |
| token_id | unique identifier for successful share request |

An example of the return share request parameters may be:

| Field | Value |
| --- | --- |
| token_id | unique identifier for the share request |

Reconstruction of a Private Key

Once a new wallet has obtained enough shares of the private key from the previous wallet (a subset of all of the shares based on the threshold setting wherein the subset may be less than or equal to the total number of shares) meeting the threshold, the key manager hosting the new wallet can reconstruct the previous private key using the sharing process described above, such as SSSS. The process for reconstruction of the secret (the private key) is a known process depending on the particular sharing process being used.

Once the private key is reconstructed, using the previous wallet's private key, the owner can now transfer the contents of the old wallet to the new one by sending a copy wallet transaction from the new wallet. The new wallet will prove that it has the old wallet's private key by signing the new wallet's public key.

An example of the copy wallet request parameters:

| Field | Value |
| --- | --- |
| previous_pubkey | pubkey of the wallet which will get a copy of the current wallet's contents |
| Signature | string signature of the current wallets pubkey with the old wallet's private key |

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for persona management, comprising:
storing an identity of a user in a location of a memory of a user's computing device comprising a wallet, the location storing a private cryptographic key associated with the identity of the user;
separating, by a key manager of the user's computing device, the private cryptographic key of the user into a plurality of portions of the private cryptographic key, each portion of the private cryptographic key being encrypted for a trusted party to whom the encrypted portion of the private cryptographic key is being shared and each portion of the private cryptographic key alone being insufficient to generate the private cryptographic key;
distributing, by the computing device, each of the plurality of encrypted portions of the private cryptographic key to a plurality of computing devices of different trusted parties;
storing information about the distribution of each encrypted portion of the private cryptographic key that was sent to each trusted party in an immutable ledger comprised of one or more blockchains and having decentralized transaction consensus; and
regenerating, by the user's computing device, the private cryptographic key of the user using a subset of the plurality of encrypted portions of the private cryptographic key as determined from the immutable ledger, wherein the subset of the plurality of encrypted portions of the private cryptographic key is greater than one portion.

2. The method of claim 1 further comprising requesting, by a new wallet of the user, to regenerate the private cryptographic key of the user using the subset of the plurality of encrypted portions of the private cryptographic key.

3. The method of claim 2, further comprising transferring contents of the wallet to the new wallet once the private cryptographic key is regenerated.

4. The method of claim 1, wherein separating the private cryptographic key of the user into the plurality of portions of the private cryptographic key further comprises using a sharing process that generates the plurality of portions of the private cryptographic key.

5. The method of claim 4, wherein the sharing process is one of Shamir's secret sharing scheme, a Chinese remainder theorem and an exclusive OR process.

6. The method of claim 4, wherein the sharing process is Shamir's secret sharing scheme and further comprises setting a threshold value of a number of the portions of the plurality of portions of the private cryptographic key that are required to generate the private cryptographic key.

7. The method of claim 6, wherein the subset of the plurality of encrypted portions of the private cryptographic key is a number of encrypted portions of the private cryptographic key greater than the threshold.

8. The method of claim 1, wherein generating the plurality of portions of the private cryptographic key for the trusted parties further comprises encrypting the portion of the private cryptographic key for each trusted party using a public cryptography key of the trusted party.

9. A method for identity recovery for an identity of a user stored in a location in a memory of a user's computing device having a private cryptographic key associated with the identity of the user, the method comprising:
  storing a plurality of portions of the private cryptographic key in a memory of computing devices at a plurality of trusted parties, each portion of the private cryptographic key having been encrypted for the trusted party to whom the encrypted portion of the private cryptographic key is being shared and each portion of the private cryptographic key alone being insufficient to generate the private cryptographic key;
  storing the information about the sharing of the encrypted portion of the private cryptographic key with the trusted parties in an immutable ledger comprised of one or more blockchains and having decentralized transaction consensus;
  requesting, by the user's computing device and from a subset of the trusted parties, a return of the encrypted portion of the private cryptographic key from each of the subset of the trusted parties as determined from the immutable ledger, the return request including one or more access grants;
  returning, from each trusted party, the encrypted portion of the private cryptographic key to the user's computing device; and
  regenerating, by the user's computing device, the private cryptographic key of the user using the encrypted portions of the private cryptographic key from the subset of the trusted parties, wherein the subset of the plurality of encrypted portions of the private cryptographic key is greater than one portion.

10. The method of claim 9 further comprising depositing a verification token at each of the subset of the trusted parties and the user and each trusted party verifying that the verification token exists for the user before returning the encrypted portion of the private cryptographic key to the user's computing device.

11. The method of claim 9, wherein returning the encrypted portion of the private cryptographic key for each trusted party further comprises each trusted party's computing device decrypting the encrypted portion of the private cryptographic key using a private cryptographic key of the trusted party and re-encrypting the decrypted portion of the private cryptographic key using a new public cryptographic key of the user.

12. A system persona management, comprising:
  a computer system of a user having a location that stores an identity of the user and having a private cryptographic key associated with the identity of the user;
  a key manager hosted by the computer system of the user having a processor and memory that are configured to:
    generate a plurality of portions of the private cryptographic key, each portion of the private cryptographic key being encrypted for a trusted party to whom the encrypted portion of the private cryptographic key is being shared and each portion of the private cryptographic key being insufficient to generate the private cryptographic key;
    distribute the plurality of encrypted portions of the private cryptographic key to a plurality of different trusted parties; and
    an immutable ledger comprised of one or more blockchains and having decentralized transaction consensus that stores the distribution of each portion of the private cryptographic key to each trusted party in the immutable ledger,
    wherein the key manager is further configured to regenerate the private cryptographic key of the user using a subset of the plurality of encrypted portions of the private cryptographic key as determined from the immutable ledger, wherein the subset of the plurality of encrypted portions of the private cryptographic key is greater than one portion.

13. The system of claim 12, wherein the key manager of the computer system of the user is further configured to regenerate the private cryptographic key of the user for a new wallet of the user.

14. The system of claim 13, wherein the location is a wallet.

15. The system of claim 14, wherein the key manager of the computer system of the user is further configured to transfer contents of the wallet to the new wallet once the private cryptographic key is generated.

16. The system of claim 12, wherein the key manager of the computer system of the user is further configured to use a sharing process that generates the plurality of portions of the private cryptographic key.

17. The system of claim 16, wherein the sharing process is one of Shamir's secret sharing scheme, a Chinese remainder theorem and an exclusive OR process.

18. The system of claim 16, wherein the sharing process is Shamir's secret sharing scheme and wherein the key manager of the computer system of the user is further configured to set a threshold value of a number of the portions of the plurality of portions of the private cryptographic key that are required to generate the private cryptographic key.

19. The system of claim 18, wherein the subset of the plurality of encrypted portions of the private cryptographic key is a number of encrypted portions of the private cryptographic key greater than the threshold.

20. The system of claim 12, wherein the key manager of the computer system of the user is further configured to encrypt the portion of the private cryptographic key for each trusted party using the public cryptography key of the trusted party.

21. A system for identity recovery for an identity of a user stored in a wallet comprising a secure location having a private cryptographic key associated with the identity of the user, comprising:
- a plurality of trusted parties each having a computing device, each trusted party storing a portion of the private cryptographic key being encrypted for the trusted party to whom the encrypted portion of the private cryptographic key is being shared and each portion of the private cryptographic key being insufficient to generate the private cryptographic key, wherein the portion of the private cryptographic key of each trusted party is stored on the trusted party's corresponding computing device;
- an immutable ledger stored on a computing system, said immutable ledger comprised of one or more blockchains and having decentralized transaction consensus that stores the information about the sharing of the encrypted portion of the private cryptographic key with the trusted parties;
- a key manager hosted on a computer system of the user that requests, from a subset of the trusted parties as determined from the immutable ledger, a return of the encrypted portion of the private cryptographic key from each of the subset of the trusted parties, the return request including one or more access grants;
- each trusted party returning the encrypted portion of the private cryptographic key to a new wallet of the user; and
- the key manager regenerating the private cryptographic key of the user using the encrypted portions of the private cryptographic key from the subset of the trusted parties wherein the subset of the plurality of encrypted portions of the private cryptographic key is greater than one portion.

22. The system of claim 21, wherein the immutable ledger deposits a verification token at a wallet of each of the subset of the trusted parties and the new wallet of the user and wherein each trusted party verifies that the verification token exists in the new wallet of the user before returning the encrypted portion of the private cryptographic key to a new wallet of the user.

23. The system of claim 21, wherein each trusted party decrypts the encrypted portion of the private cryptographic key using a private cryptographic key of the trusted party and re-encrypts the decrypted portion of private cryptographic key using a new public cryptographic key of the user.

24. A method for generating a private key of a user for a transaction wherein a plurality of portions of the private cryptographic key are stored at a plurality of trusted parties, each portion of the private cryptographic key having been encrypted for the trusted party to whom the encrypted portion of the private cryptographic key is being shared and each portion of the private cryptographic key being insufficient to generate the private cryptographic key, the method comprising:
- requesting, from a subset of the trusted parties as determined from an immutable ledger comprised of one or more blockchains, a return of the encrypted portion of the private cryptographic key from each of the subset of the trusted parties, the return request including one or more access grants;
- returning, from each trusted party, the encrypted portion of the private cryptographic key; and
- re-generating the private cryptographic key of the user for the transaction using the encrypted portions of the private cryptographic key from the subset of the trusted parties, wherein the subset of the plurality of encrypted portions of the private cryptographic key is greater than one portion.

25. The method of claim 24 further comprising depositing a verification token at each of the subset of the trusted parties and an entity managing the transaction and each trusted party verifying that the verification token exists for the user before returning the encrypted portion of the private cryptographic key to the user.

26. The method of claim 24, wherein returning the encrypted portion of the private cryptographic key for each trusted party further comprises decrypting the encrypted portion of the private cryptographic key using a private cryptographic key of the trusted party and re-encrypting the decrypted portion of private cryptographic key using a new public cryptographic key of an entity managing the transaction.

* * * * *